(12) United States Patent
Greeson

(10) Patent No.: US 8,438,996 B2
(45) Date of Patent: May 14, 2013

(54) MICRO LAYERING PEST CONTROL SYSTEM

(75) Inventor: John S. Greeson, Roswell, NM (US)

(73) Assignee: Dairy Solutions, Inc., Roswell, NM (US)

( * ) Notice: Subject to any disclaimer, the term of this patent is extended or adjusted under 35 U.S.C. 154(b) by 472 days.

(21) Appl. No.: 12/487,702

(22) Filed: Jun. 19, 2009

(65) Prior Publication Data

US 2010/0319628 A1    Dec. 23, 2010

(51) Int. Cl.
*A01K 13/00*    (2006.01)

(52) U.S. Cl.
USPC .......................................... 119/651; 119/665

(58) Field of Classification Search ............... 119/651, 119/650, 665, 656, 658, 666, 667, 669
See application file for complete search history.

(56) References Cited

U.S. PATENT DOCUMENTS

| 3,602,199 | A | * | 8/1971 | Diggs | 119/667 |
| 3,694,545 | A | | 9/1972 | Roth et al. | |
| 3,699,928 | A | * | 10/1972 | Cowan | 119/667 |
| 3,870,023 | A | * | 3/1975 | Wilson | 119/666 |
| 4,126,104 | A | * | 11/1978 | Overby | 119/667 |
| 4,334,504 | A | * | 6/1982 | Matthews | 119/667 |
| 4,533,254 | A | * | 8/1985 | Cook et al. | 366/176.1 |
| 4,614,300 | A | * | 9/1986 | Falcoff | 239/71 |
| 5,063,880 | A | * | 11/1991 | Bouthillier | 119/667 |
| 5,260,875 | A | * | 11/1993 | Tofte et al. | 701/50 |
| 5,482,369 | A | * | 1/1996 | Verstallen | 366/162.4 |
| 5,630,379 | A | * | 5/1997 | Gerk et al. | 119/667 |
| 5,785,004 | A | * | 7/1998 | Hobbs | 119/651 |
| 6,651,589 | B2 | * | 11/2003 | Greeson | 119/665 |
| 6,779,489 | B2 | * | 8/2004 | Greeson | 119/665 |
| 6,966,276 | B2 | * | 11/2005 | Dollar | 119/667 |
| 7,252,715 | B2 | * | 8/2007 | Watts et al. | 118/688 |
| 2003/0110101 | A1 | * | 6/2003 | Friel et al. | 705/28 |

* cited by examiner

*Primary Examiner* — Rob Swiatek
*Assistant Examiner* — Ebony Evans
(74) *Attorney, Agent, or Firm* — Ray R. Regan

(57) ABSTRACT

A micro layering pest control system that includes combining generally immiscible ingredients in a container, maintaining the ingredients in a combined state by substantially continuously agitating and homogenizing the combined ingredients under pressure, and discharging the combined ingredients in one or more applications.

27 Claims, 4 Drawing Sheets

MICRO LAYERING PEST CONTROL SYSTEM

FIELD OF TECHNOLOGY

The apparatus, method and system disclosed, illustrated and claimed in this document pertain generally to controlling pests on animals. More particularly, the new and useful micro layering pest control system of this document is capable of combining generally immiscible ingredients in such a way that the chemical and physical properties of the respective constituent ingredients following combination are unaltered, thus providing the combined ingredients for application on an animal in such a way that reduces dispersal and excessive use of the ingredients during discharge and after application of the ingredients on an animal. The micro layering pest control system is, consequently, useful for applying ingredients on an animal for effective pest control.

BACKGROUND

Control and management of pests has proven challenging, costly, illusive, and frequently ineffective. Pests of concern to dairy herdsman include (i) not only the conventional classes of arthropods and related classes and orders known as muscoid and nonmuscoid flies, but also (ii) arachnids, a class of mainly terrestrial arthropods comprising spiders, scorpions, mites, ticks, and the like, (iii) ectoparasites, which are parasites living on the surface of an animal, (iv) endoparasites, parasites living within an animal, and (v) pathogens, viruses, bacteria, spores and similar agents of disease.

Left uncontrolled, pests have significant impact on the economics of animal production. The dairy cattle industry has been estimated to produce $38 billion annually in the United States. Uncontrolled flies, for example, may irritate cows so severely that milk production suffers; disease pathogens maybe transmitted; enteric (intestinal) diseases among humans associated with cow herds may increase; and a variety of regulatory rules and regulations may be violated.

Exemplary solutions for solving problems arising from pests among dairy herds were provided by the inventor named in this document in connection with U.S. Pat. No. 6,230,660 B2 issued May 15, 2001; U.S. Pat. No. 6,651,589 B2 issued Nov. 25, 2003; U.S. Pat. No. 6,779,489 B2 issued Aug. 24, 2004; and U.S. Pat. No. 7,194,980 B2, issued Mar. 27, 2007 (collectively, "Prior Patents").

The apparatus, systems and methods of the Prior Patents have achieved the level of pest control demanded by industry operators. They provide substantially automated control of pest populations on dairy cattle to an extent not possible before the evolution of varying solutions provided in the Prior Patents. Indeed, the apparatus, systems and methods of the Prior Patents have become the most widely used pest control systems for large dairy herds in the United States. The apparatus of the Prior Patents are capable of consistently applying a moderately thick oil-based carrier containing at least one chemical (for example, an insecticide) and water, ingredients that may be finely misted onto cattle during operation, while allowing cattle to return to their pens after milking.

Industry operators, however, particularly those with large dairy herds, expressed a desire and need to be able to apply ingredients having significantly thicker oil-based carriers, with higher viscosities, containing one or more insecticides that on application to an animal such as a cow would neither be absorbed into the hair of the cow, nor dispersed on discharge of an application from a sprayer.

Another capability desired by dairy industry operators included the capability to increase the volume of ingredients applied during an individual application of ingredients on an animal. Certain combinations of ingredients combined within short periods of time during which the application was applied could, in some instances, result in sprays that were too fine. The direction of such fine sprays following emission from a sprayer could be altered by air currents occurring either inside or outside of a building in which the applications were applied to an animal (in this document, "dispersal" and/or "misting"). To overcome such problems, an operator might be required to apply more ingredients than would otherwise be needed for a particular objective in a pest control management plan, thus increasing costs of operation. In addition, the effectiveness of an application might decrease or degrade the longer the time lapse between an earlier and a subsequent application.

Misting chemicals and/or oils may create a number of problems for both a dairy and animals. Misting chemicals and/or oils blown off target may create undesirably extensive and thick coatings of oil that may coat people, buildings, and surrounding structures and areas. Dairymen who use oil-based chalk to mark and identify animals are hindered if an animal's hide is excessively oily. The most desirable location for installing a pest control system for cattle is a location close to the entry of cattle into a barn or stall where cattle will be milked. However, any misting oil containing insecticides could drift and contact milking equipment and milking personnel. In addition, the comparatively small orifice of sprayer nozzles require inclusion of fine mesh filters that clog, requiring frequent servicing and cleaning if misting is excessive.

Accordingly, it seemed desirable to develop a pest control system that would be capable of combining ingredients such as water, oil, and chemicals that tend to be immiscible, but combining them in such a way that their properties are unaltered as a result of the combining process, and that also would reduce dispersal and excess use of ingredients during a discharge or application of the ingredients on an animal.

However, a variety of problems presented obstacles to design and development of such a system.

Heating the chemicals and/or oil prior to use proved unsuccessful in overcoming the problems caused by misting.

Trying to force high viscosity oils through a sprayer system proved ineffective. High internal pressures within tubing, hoses and pumps associated with a spraying system averaged 80-350 pounds per square inch ("psi"), creating premature wear and fatigue in sprayer components.

Other problems arose due to the physical and chemical properties of the ingredients themselves. For example, the thicker the oil, the faster it separates. Adding chemical emulsifiers to the combined water and oil proved ineffective due to the large volumes of water used on dairy cattle: large amounts of water remove oil and chemicals from an animal. Chemical emulsifying agents are affected by atmospheric moisture which may be drawn into, and dilute, the chemicals, and result in oxidization.

Other problems also became apparent. Injecting oil and water together at the tip of a nozzle on a sprayer is ineffective because injection rates vary significantly. A thick oil will alter injection pressure from 8,000 psi to approximately 100 psi during a temperature range variation from 40 to 110 degrees Fahrenheit, making installation and operation of pumps and associated equipment not only expensive, but also complicated and dangerous to perform maintenance on.

Injecting oil into lines containing water without agitating and recirculating the ingredients also proved ineffective. Oil separates and floats to higher levels of mixed ingredients. As a consequence, during spraying the oil coagulates, causing uneven discharges from the sprayer on the animal.

As discussed in the Prior Patents, many other techniques for controlling pests on cattle have proven only marginal in achieving control of flies for long periods of time, including fogging; feeding cows oral larvicide; applying residual pesticides on the underside of shaders; larvicide spraying; back rubbers; and ear tags or other apparatus attachable to parts of an animal's body containing a liquid chemical or pesticide dispensable on an animal.

Accordingly, it would be of considerable advantage to provide a new and useful apparatus, method and system for micro layering pest control applications of combined ingredients on an animal capable of achieving effective pest control using generally immiscible ingredients whose properties would not change during the process of combining the ingredients, and resulting in reduced dispersal and reduced use of comparatively expensive ingredients during application of the ingredients on an animal's body.

SUMMARY

The apparatus, system, and method disclosed, illustrated, and claimed in this document address the above-stated needs by combining the ingredients, maintaining the ingredients in a combined state by substantially continuously agitating the combined ingredients under pressure, and applying the combined agitated and pressurized ingredients in one or more successive micro layering applications on an animal.

In one aspect, a method is provided for combining generally immiscible ingredients. The combined ingredients are maintained in a combined state by substantially continuously agitating the combined ingredients under pressure until the ingredients are substantially homogenized, without altering the properties of the combined ingredients. The combined ingredients may be applied in one or more applications.

In another aspect, a method of controlling pests on an animal is provided. Ingredients for controlling the pests are combined under pressure in such a way that neither the physical nor chemical properties of the ingredients are altered. The ingredients are substantially continuously agitated under pressure, and subsequently applied on the animal in one or more successive micro layering applications.

In yet another aspect, a method of applying ingredients on an animal for pest control is provided that combines substantially immiscible ingredients under pressure in such a way that the physical and chemical properties of the ingredients are unaltered although agitated and circulated under pressure to achieve substantial homogenization of the ingredients. The agitated and circulated ingredients are applied to the animal in one or more successive micro layering applications in such a way that dispersal and excessive use of the ingredients are avoided.

In another aspect, an apparatus for controlling pests on an animal is provided. The apparatus includes means for combining generally immiscible ingredients. Means for maintaining the ingredients in a combined state also is provided. In addition, a device for applying the combined ingredients in one or more successive micro layering applications on the animal is included.

In still another aspect, a system for reducing dispersal and excessive use of ingredients during application of the ingredients on an animal is provided. The system includes an ingredient circulation mechanism for combining at least immiscible ingredients. A programmable controller is operatively connectable to the chemical and water recirculation device capable of receiving, storing, executing, and transmitting instructions related at least to substantially continuously agitating the ingredients in the ingredient circulation mechanism. A sprayer device is connected to the programmable controller for applying the combined ingredients to an animal during one or more micro layering applications.

In another aspect, a method of applying pest control ingredients on an animal is provided that minimizes dispersal and use of ingredients is provided for providing a controller having one or more data processing systems having a set of computer instructions for collecting, storing, processing and transmitting to a sensor a signal that an animal is in proximity of a sprayer capable of applying the ingredients on the animal. Also included in the controller is a set of computer instructions for controlling the combining of the ingredients under pressure in such a way that the properties of the ingredients remain unchanged after the combining. The controller is operatively connectable to a sprayer for applying the combined ingredients on the animal. The sprayer device discharges a micro layering application of the combined ingredients onto the animal.

As a result, micro layering achieves a number of technical advancements by overcoming the problems identified above.

For example, 4,000 Vis oil is 19 parts water combined to produce a treatment substance that may be sprayed or applied at the comparatively low pressure 25 psi. The ability to reduce system pressure to 25 psi permits a system operator to adjust droplet spray size, which in turn allows the operator to adjust the amount of treatment substance such as the chemical and/or water to be applied to an animal, while avoiding misting or related problems. Micro layering also permits the system operator to use sprayer tips that are large enough in size to avoid clogging.

Microlayering allows application of varying treatment substances more than once per day. Microlayering therefore increases the effectiveness of coverage of an animal by allowing cost effective and treatment effective multiple overlapping coverages.

The apparatus, systems and methods shown in this document have increased effectiveness of applications of ingredients by approximately 200% while at the same time both reducing use of expensive chemicals by approximately 70%, and substantially eliminating oil misting problems.

It will become apparent to one skilled in the art that the claimed subject matter as a whole, including the structure of the apparatus, and the cooperation of the elements of the apparatus, combine to result in a number of unexpected advantages and utilities. The structure and co-operation of structure of the micro layering pest control system will become apparent to those skilled in the art when read in conjunction with the following description, drawing figures, and appended claims.

The foregoing has outlined broadly the more important features of the invention to better understand the detailed description that follows, and to better understand the contributions to the art. The micro layering pest control system is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the micro layering pest control system, which is measured by the claims, nor intended to limit the scope of the claims. The novel features of the micro layering pest control system are best understood from the accompanying drawing, considered in connection with the accompanying description of the drawing, in which similar reference characters refer to similar parts, and in which:

Figure 1:
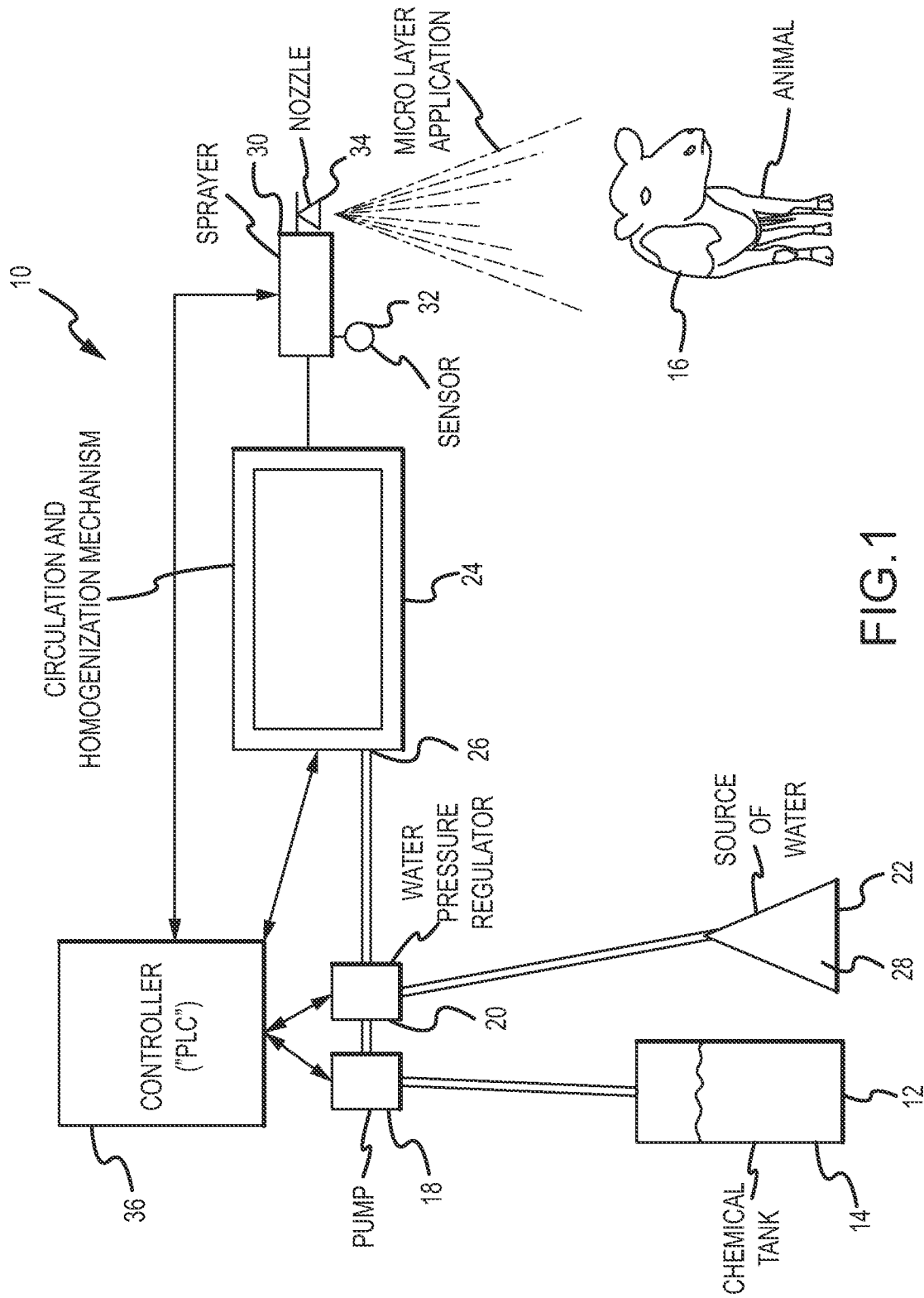
FIG. 1 of the drawing is a schematic and diagrammatic view of the micro layering pest control system.

To the extent that the numerical designations in the drawing figures include lower case letters such as "a,b" such designations include multiple references, and the letter "n" in lower case such as "a-n" is intended to express a number of repetitions of the element designated by that numerical reference and subscripts.

DETAILED DESCRIPTION

Definitions

The term "pest" and/or "pests" as used in this document means pests of concern to dairy herdsman, and include (i) not only the conventional classes of arthropods and related classes and orders known as muscoid and nonmuscoid flies, but also (ii) arachnids, a class of mainly terrestrial arthropods comprising spiders, scorpions, mites, ticks, and the like, (iii) ectoparasites, which are parasites living on the surface of an animal, (iv) endoparasites, parasites living within an animal, and (v) pathogens, viruses, bacteria, spores and similar agents of disease.

The term "effective" means application of a complete coverage of ingredients on an animal, while also reducing or eliminating use of excessive amounts of ingredients during application of the ingredients on an animal, including comparatively expensive ingredients such as chemicals and oils.

The term "ingredients" means at least water, a pesticide, an oil acting as a carrier for the pesticide, alternative chemicals, and other substances and compounds used for controlling pests on an animal. The related term "carrier-based ingredients" includes a variety of carriers such as oil, silicon, polymers, gels, and thickening agents that may be chemically inert.

The term "chemical" means as non-exclusive examples pyrethroids, organopolysiloxanes, organophosphates, and systemic endoparisites.

The term "treatment substance" means ingredients for application on an animal for treatment purposes after the ingredients have been combined as disclosed in this document.

The term "immiscible" means at least liquids that generally will not mix together to form a single homogeneous substance. As taught in this document, in the use and operation of the micro layering pest control system, the physical and chemical properties of ingredients that tend to be immiscible are not altered during a combination performed under pressure. As a result, on application of the ingredients on an animal, the ingredients perform the desired pest control.

The term "dispersal" means at least scattering, misting, and drifting of ingredients used to treat an animal when applied on an animal, including ingredients having a high evaporation rate.

The term "excessive use" means application of unnecessarily thick layers of ingredients on an animal body to achieve coverage of the animal.

The term "treatment" or "treating" of an animal such as cattle means at least control of pests.

The term "combining" means formation of either a mixture, admixture, suspension, or homogenization of ingredients that in an uncombined state may have a propensity to separate, including water, chemicals including pesticides, viscous oils, ingredients not inherently soluble, and other ingredients.

The term "micro layering" means successive layers of ingredients applied to an animal in amounts consistent with a treatment plan and consistent with achieving one or more effective applications that may overlap a prior application of a micro layer of ingredients.

The term "controller" includes but is not limited to a microprocessor (such as an integrated circuit containing a central processing unit of a computer on one or more chips, such that only the memory and input-output functionalities need be added), but also includes any computer-related device that may be programmed with instructions to conduct a sequence of operations leading to discharge of ingredients from dispensers. The term "controller" therefore may include a computer, digital signal processor, including wireless technologies, and other equivalent devices.

The term "signal" includes but is not limited to a detectable physical quantity, pulse or impulse, such as a voltage, current, or magnetic field strength, as well as mechanical means for activation.

The term "activate" includes but is not limited to discharging one or more ingredients on an animal.

The term "animal" includes cattle, and thus both cows and steers, as well as other animals and mammals.

The term "exemplary" means serving as an example, instance, or illustration; any aspect described in this document as "exemplary" is not intended to mean preferred or advantageous over other aspects of the micro layering pest control system.

Description

As shown in FIGS. 1-4, a micro layering pest control system is provided that in its broadest context includes combining generally immiscible ingredients. The combined ingredients are maintained in a combined state by substantially continuously agitating the combined ingredients under pressure until the ingredients are substantially homogenized, without altering the properties of the combined ingredients. The combined ingredients are applied to an animal in one or more applications in desired quantities.

Figure 2:
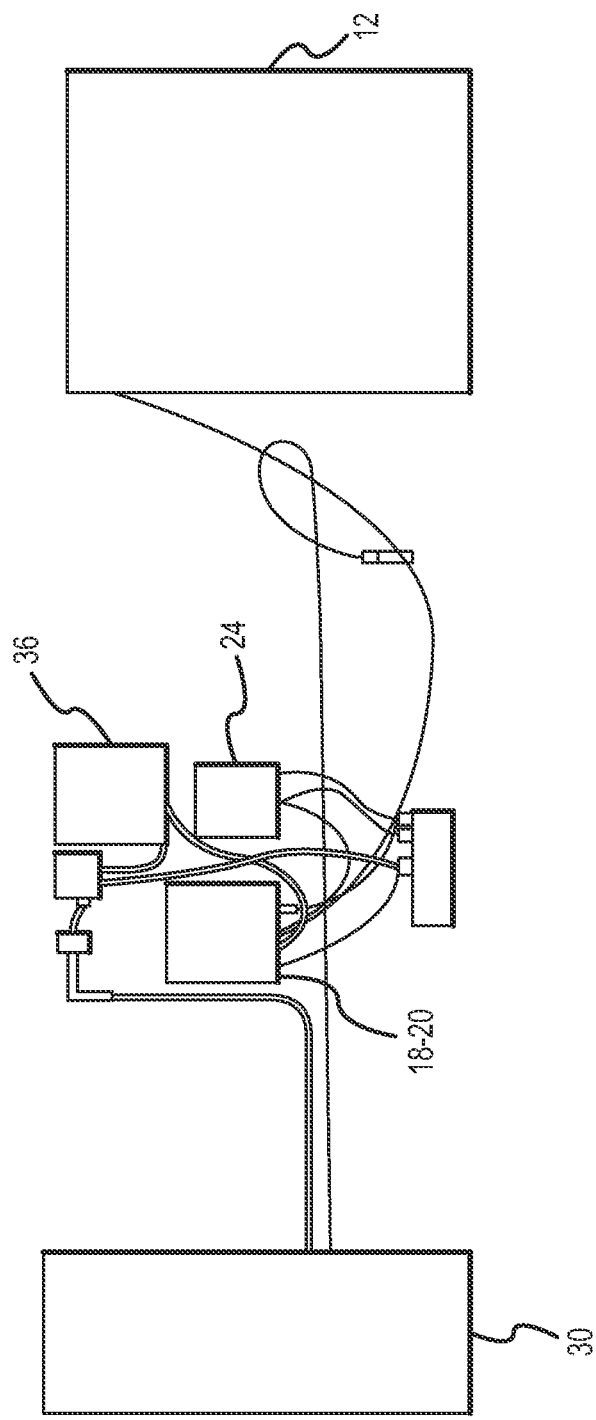
FIG. 2 is a perspective view of selected components of the micro layering pest control system in part mounted on a wall.

More specifically, referring initially by cross-reference between FIGS. 1-2, a micro layering pest control system 10 is shown to include a tank 12. The tank 12 is provided for holding at least one chemical 14. Non-exclusive examples of chemicals useful for pest control in connection with cattle are pyrethroids, organopolysiloxanes, organophosphates, and systemic endoparisites. As a person skilled in the art will appreciate, however, a number of alternative chemicals may be used for effective micro layering of animals for pest control. The chemical 14 held in the tank 12 is but one ingredient that may be combined to be sprayed on an animal 16 from the micro layering pest control system 10. Other ingredients may include water, a pesticide, an oil acting as a carrier for the pesticide, alternative chemicals, and other substances and compounds used for controlling pests on an animal. Additional carriers include not only oil, but also silicon, polymers, gels, and thickening agents.

As also illustrated in FIG. 1, the tank 12 is in fluid communication with a pump 18. The pump is an injection pump that injects the chemical 14 from the tank 12 with a regulated water stream that is produced by the combination of the chemical 14 with water by a pressure regulator 20. As illustrated, the pressure regulator 20 is in fluid communication with a source of water 22. The source of water 22 generally is available in a barn or similar enclosure in which cattle are held for purposes of applying the ingredients of the micro layering pest control system 10 onto an animal 16 such as a cow.

Both the injection pump 18 and the water pressure regulator 20 are in fluid communication with an ingredient circulation mechanism 24, as also illustrated in FIG. 1. The ingredient recirculation mechanism 24 for combining the generally immiscible ingredients is a recirculation pump capable of inducing at least low pressure in a partial vacuum in the recirculation pump. The recirculation mechanism 24 is further capable of substantially homogenizing the generally immiscible ingredients.

In operation, the ingredient circulation mechanism 24 circulates and recirculates ingredients injected into the ingredient circulation mechanism 24 from the injection pump 18 and the water pressure regulator 20 at the intake orifice 26 of the ingredient circulation mechanism 24. By injecting both the chemical 14 and the water 28 into the ingredient circulation mechanism 24 under pressure, a low pressure point is achieved, as low as 10 psi, at the intake orifice 26. As ingredients from the injection pump 18 and the water pressure regulator 20 are injected into the ingredient circulation mechanism 24, pressure may be adjusted within the ingredient circulation mechanism 24. Pressure within the ingredient circulation mechanism 24 may be adjusted, for example, to 40 psi. The ingredient circulation mechanism 24 circulates and recirculates the combined ingredients, allowing the chemical 14 and the water 28 to blend as part of the combining of ingredients, and to become substantially homogenized. The substantially homogenized ingredients are circulated and recirculated within the ingredient circulation mechanism 24 until discharged onto an animal.

As also shown in FIG. 1, a sprayer 30 is provided. The sprayer 30 is in fluid communication with the ingredient circulation mechanism 24. The sprayer 30 includes a sensor 32. The sensor 32 is used to detect the proximity and/or presence of an animal 16 in relation to the sprayer. In addition, the sprayer 30 is equipped with at least one nozzle 34. The nozzle 34 is capable of emitting one or more micro layer applications onto the animal 16 as illustrated in FIG. 1.

As also illustrated by cross-reference between FIGS. 1-2, a controller 36 is provided. The controller 36 is provided for maintaining the ingredients in a combined state. The controller 36 is capable of receiving, storing, executing and transmitting programmable instructions related to a number of functions. The controller 36 is operatively connected to the injection pump 18, and is capable of transmitting instructions regarding at least the amount of chemical 14 to be transmitted to the water pressure regulator 20, and the timing of injections. The controller 36 also is operatively connected to the water pressure regulator 20, and is capable of transmitting instructions regarding at least the amount of water 28 to be drawn from the water source 22 and injected into the ingredient circulation mechanism 24 in combination with the chemical 14 from the injection pump 18. The controller 36 also is capable of transmitting instructions to the water pressure regulator 20 regarding at least the water pressure adjustment desired for a desired pest control application.

The controller 36 also is operatively connected to the ingredient circulation mechanism 24, and is capable of transmitting instructions regarding at least the pressure adjustment to make during operation of the ingredient circulation mechanism 24 following injection of the ingredients from the injection pump 18 and from the water pressure regulator 20. The controller 36 also is capable of transmitting instructions to the ingredient circulation mechanism 24 to substantially continuously agitate and homogenize the generally immiscible ingredients in the ingredient circulation mechanism 24. The controller 36 also is capable of executing programmable instructions for selectively combining ingredients desired for one or more successive micro layering applications on an animal 16.

The controller 36 also is operatively connected to the sprayer 30, and is capable of transmitting instructions regarding at least the quantity and timing of the discharge of a micro layering application to an animal 16 in response to a signal from the sensor 32 transmitted to the controller 36.

As a person skilled in the art will appreciate, the explanation listed above about what the controller 36 is capable of receiving, storing, executing and transmitting are not limitations of the micro layering pest control system 10 of this document. The controller 36 is capable of programming and re-programming to provide any number of steps and algorithms to achieve desired micro layering applications. The controller 36 may, for example, be programmed to achieve the technical advantage of combining ingredients that generally are immiscible in such a way that the properties of the respective ingredients following combination are unaltered, which in turn produces an application of ingredients on an animal 16 that reduces dispersal and excessive use of ingredients during discharge or application of the ingredients on an animal 16.

Because the controller 36 is operatively connectable at least to the ingredient circulation mechanism 24, to the injection pump 18, to the water pressure regulator 20, and to the sprayer 30, the controller 36, on receipt of a sensor-activated signal from the sensor 32 regarding the presence of an animal 16, is capable of discharging the combined and homogenized immiscible ingredients from the nozzle 34 of the sprayer on the animal 16.

Figure 3:
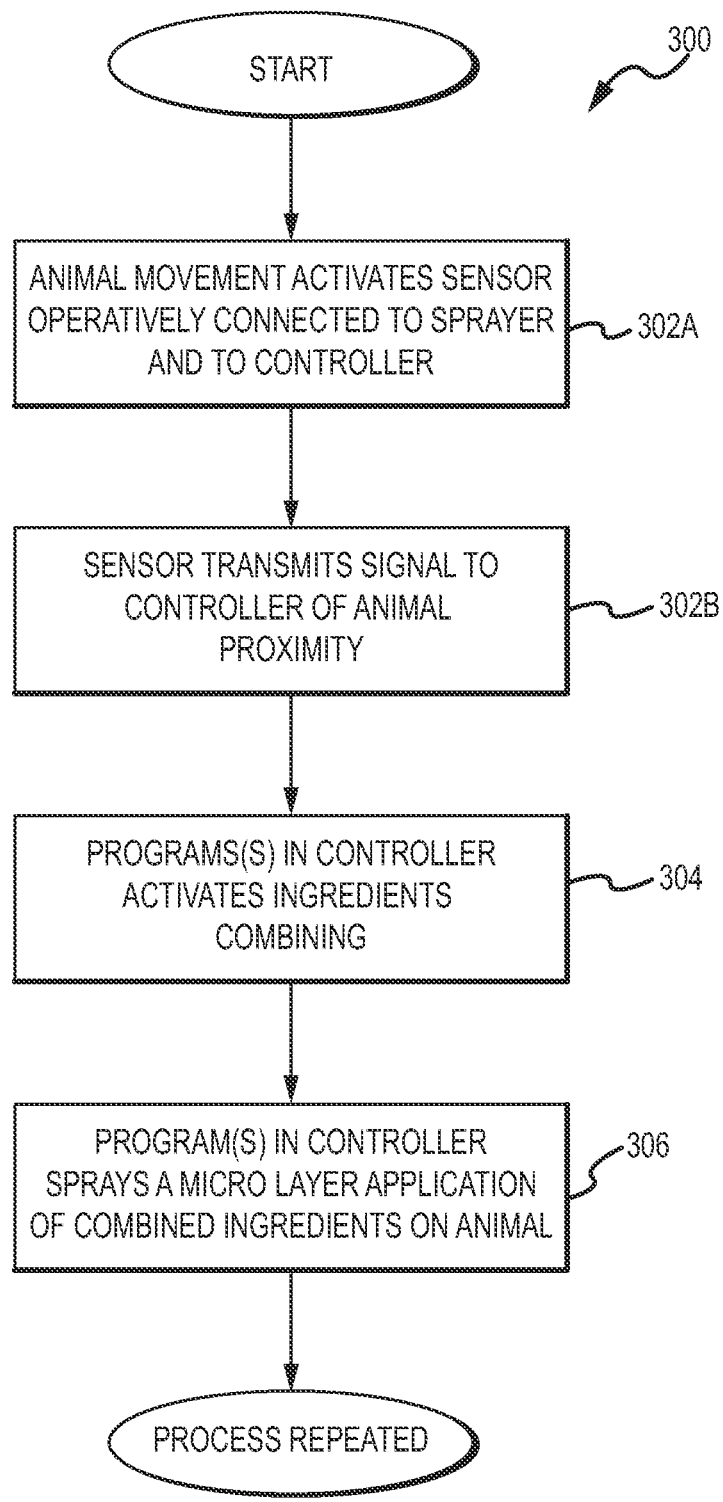
FIG. 3 is a flowchart of one aspect of operating the micro layering pest control system.

Referring now to FIG. 3, a method 300 of applying pest control ingredients on an animal that minimizes dispersal and use of ingredients is illustrated diagrammatically. As illustrated at block 302A-B, the method 300 includes providing a controller having one or more data processing systems with a set of computer instructions for collecting, storing, processing and transmitting from a sensor a signal that an animal is in proximity of a sprayer capable of applying the ingredients on an animal. Block 304 illustrates that the controller includes a set of computer instructions for controlling the combining of the ingredients under pressure in such a way that the properties of the ingredients remain unchanged after the combining. As illustrated, the controller is operatively connected to a sprayer. In addition, the controller is operatively connected to an ingredient circulation mechanism in which the ingredients are combined. Block 306 illustrates that the controller may be activated to apply one or more micro layering applications of the combined ingredients onto the animal.

Figure 4:
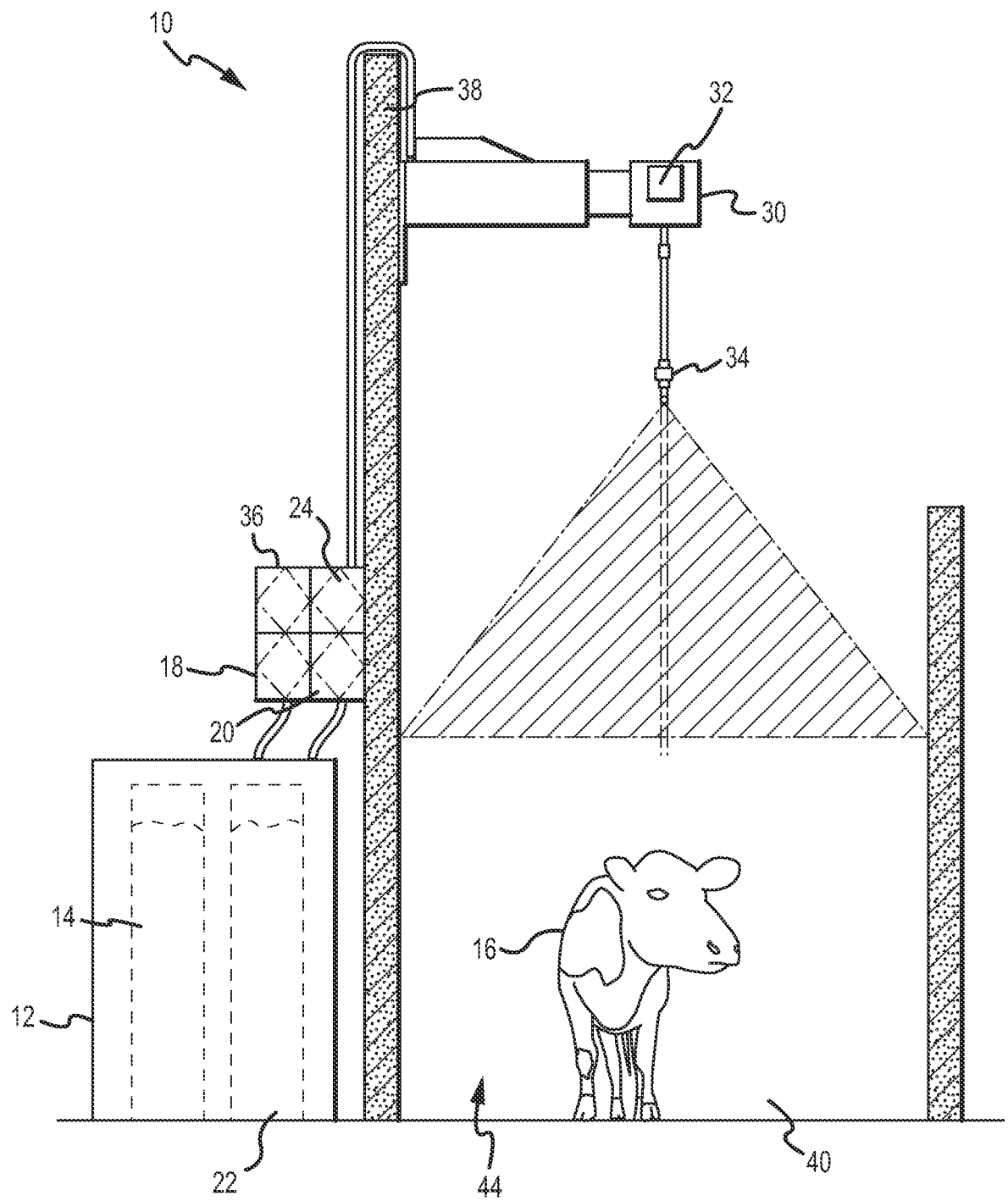
FIG. 4 is a perspective view of selected components of the micro layering pest control system.

Referring to FIG. 4, an arrangement of the component parts of the micro layering pest control system 10 is shown. FIG. 4 provides one illustration of the micro layering pest control system 10 in an operative environment. As illustrated, a substantially automated sprayer 30 is in fluid communication with one or more sources of ingredients 14, 22, a controller 36, a pump 18, a water pressure regulator 20, and an ingredient circulation mechanism 24.

An animal 16 such as a cow is shown moving beneath the substantially automated sprayer 30. The automated sprayer 30 is shown mounted on a first wall 38 inside an enclosure 40 to enable the animal 16 to pass beneath the automated sprayer 30. A second wall 42 of the enclosure 40 permits an operator of a dairy herd to direct an animal 16 such as a cow through an exit alley 44.

As also illustrated in FIG. 4, a tank 12 is provided for holding one or more ingredients such as a chemical. As will be evident to one skilled in the art, the one or more ingredients may be separated and held in one or more tanks or reservoirs. The tank 12 is shown to be in fluid communication with the injection pump 18 and the water pressure regulator 20, as well as in fluid communication with the ingredient circulation mechanism 24. A nozzle 34 is also illustrated in FIG. 4. Substantially complete coverage of a micro layering application on an animal 16 is achievable by the nozzle 34. A sensor 32 is provided for detecting the animal 16. Continuing innovations in sensor technology afford selection of a variety of useful sensors in conjunction with the sprayer 30, including through-beam sensors, retroflective sensors, diffuse or proximity mode sensors, convergent beam sensors, and ultrasonic sensors.

At least one example of an ingredient circulation mechanism is manufactured by Standex, Procon Products, Murfreesboro, Tenn., as a canned motor pump model 7000 as a single phase pump with an inlet pressure of 100 psi; and at least one example of the pressure regulator is the water safety and flow control pump model 26A manufactured by Watts Regulator Company of North Andover, Me.; and at least one example of the pump in fluid communication with the tank for holding chemicals is a 300 Series OEM pump manufactured by Watson-Marlow, Inc., of Wilmington, Me. However, as a person skilled in the art will appreciate, none of those devices is a limitation of the micro layering pest control system of this document, and any number of alternative apparatus may achieve the unique functions of the method, apparatus and system disclosed in this document.

Claim elements and steps in this document have been numbered solely as an aid in understanding the description. The numbering is not intended to, and should not be considered as intending to, indicate the ordering of elements and steps in the claims. In addition, the micro layering pest control system shown in drawing FIGS. 1 through 4 shows at least one aspect of the micro layering pest control system that is not intended to be exclusive, but merely illustrative of the disclosed embodiments.

What is claimed is:

1. A method of controlling pests on an animal, comprising:
   combining generally immiscible ingredients;
   maintaining the ingredients in a combined state by substantially continuously agitating and homogenizing the combined ingredients under pressure; and
   discharging selected desired quantities of the combined ingredients in one or more applications on the animal.

2. A method as recited in claim 1, wherein combining generally immiscible ingredients further comprises providing a source of water.

3. A method as recited in claim 2, wherein combining generally immiscible ingredients further comprises providing a pressure regulator in fluid communication with and operatively connectable to the source of water adapted to regulate the pressure of the water.

4. A method as recited in claim 1, wherein combining generally immiscible ingredients further comprises providing a tank for holding at least one carrier-based chemical.

5. A method as recited in claim 4, wherein combining generally immiscible ingredients further comprises providing an injection pump in fluid communication with and operatively connectable to the tank.

6. A method as recited in claim 1, wherein maintaining the ingredients in a combined state by substantially continuously agitating the combined ingredients under pressure further comprises an ingredient circulation mechanism for combining the generally immiscible ingredients.

7. A method as recited in claim 6, wherein maintaining the ingredients in a combined state by substantially continuously agitating the combined ingredients under pressure includes selecting a pump for ingredient circulation mechanism.

8. A method as recited in claim 7, wherein installing the ingredient circulation mechanism provides for substantially homogenizing the combined generally immiscible ingredients.

9. A method as recited in claim 1, wherein maintaining the ingredients in a combined state by substantially continuously agitating the combined ingredients under pressure includes using a programmable controller capable of receiving, storing, executing, and transmitting instructions for agitating and homogenizing the generally immiscible ingredients, for receiving signals from a sensor, and for directing the ingredients to a sprayer to be applied in one or more applications.

10. A method as recited in claim 1, wherein applying the combined ingredients in one or more applications includes applying the combined ingredients through a nozzle.

11. An apparatus as recited in claim 1, wherein applying the combined ingredients in one or more applications includes applying one or more micro layering applications.

12. A method of controlling pests on an animal such as a cow, comprising:
    combining ingredients under pressure in such a way that neither the physical nor chemical properties of the ingredients are altered;
    substantially continuously agitating and homogenizing the combined ingredients under pressure; and
    applying the combined and agitated ingredients on the cow in one or more successive micro layering applications that include desired quantities of the ingredients during a plurality of passes of the cow past the means for applying the combined and agitated ingredients.

13. A method as recited in claim 12, wherein combining ingredients includes providing water.

14. A method as recited in claim 12, wherein combining ingredients includes providing a regulator for regulating water pressure.

15. A method as recited in claim 12, wherein combining ingredients includes providing a ingredient circulation mechanism.

16. A method as recited in claim 15, wherein combining ingredients includes providing means for holding and delivering the ingredients to the ingredient circulation mechanism.

17. A method as recited in claim 16, wherein substantially continuously agitating the combined ingredients includes providing for homogenization of the ingredients.

18. A method as recited in claim 17, wherein substantially continuously agitating the combined ingredients under pressure includes providing for recirculation of the ingredients within the ingredient circulation mechanism.

19. A method as recited in claim 18, wherein substantially continuously agitating the combined ingredients under pressure includes providing means for substantially homogenizing the recirculated.

20. A method as recited in claim 12, wherein substantially continuously agitating the combined ingredients under pressure includes installing a programmable controller capable of receiving, storing, executing, and transmitting instructions related at least to agitating the ingredients.

21. A method as recited in claim 12, wherein applying the combined and agitated ingredients to the animal in one or more successive micro layering applications includes applying the ingredients with at least one sprayer.

22. A method as recited in claim 12, wherein applying the combined and agitated ingredients to the animal in one or more successive micro layering applications during a plurality of passes of the cow past the means for applying the combined and agitated ingredients includes using one or more sensors to identify the location of the cow.

23. A method of applying ingredients on an animal for pest control, comprising:
   combining substantially immiscible ingredients under pressure in such a way that the physical and chemical properties of the ingredients are unaltered;
   agitating and circulating the substantially immiscible ingredients under pressure to achieve substantial homogenization of the ingredients;
   maintaining the ingredients in an agitated and a substantially homogeneous state; and
   applying selected quantities of the ingredients to the animal in one or more successive micro layering applications in a way that avoids dispersal and excessive use of the ingredients including a plurality of passes of the animal past a means for applying the ingredients on the animal.

24. A method of applying pest control ingredients on an animal that minimizes dispersal and use of ingredients, the method comprising:
   A) providing a controller having one or more data processing systems with a set of computer instructions for selecting desired quantities of the ingredients to be combined and applied to the animal in desired proportions, and for collecting, storing, processing and transmitting instructions related to a number of functions and also transmitting instructions in response to a signal from a sensor that an animal is in proximity of a sprayer capable of applying the ingredients on the animal;
   B) including in the controller a set of computer instructions for controlling the combining of the ingredients in such a way that the ingredients are circulated, agitated, and homogenized under pressure in such a way that the properties of the ingredients remain unchanged after the combining;
   C) operatively connecting the controller to the sprayer;
   D) operatively connecting the controller and the sprayer to a container in which the ingredients are combined; and
   E) activating a micro layering application of the combined ingredients onto the animal during a plurality of passes of the animal past the sprayer.

25. A method of applying pest control ingredients on an animal that minimizes dispersal and use of ingredients as recited in claim 24, the method further comprising:
   F) combining ingredients that a generally immiscible in each other.

26. A method of applying pest control ingredients on an animal that minimizes dispersal and use of ingredients as recited in claim 24, the method further comprising:
   G) selecting water as an ingredient;
   H) selecting an oil as an ingredient; and/or
   I) selecting a chemical and an oil as an ingredient.

27. A method of applying pest control ingredients on an animal that minimizes dispersal and use of ingredients as recited in claim 24, the method further comprising
   combining the ingredients in such a way that the ingredients are substantially homogenized before the micro layering application of the combined ingredients onto the animal.

* * * * *